US012758934B2

(12) United States Patent
Zhao et al.

(10) Patent No.: US 12,758,934 B2
(45) Date of Patent: Oct. 13, 2026

(54) CATALYTIC REACTION UNIT AND REACTIVE DISTILLATION COLUMN

(71) Applicants: CHINA PETROLEUM & CHEMICAL CORPORATION, Beijing (CN); SINOPEC Dalian Research Institute of Petroleum and Petrochemicals Co., Ltd., Dalian (CN)

(72) Inventors: Yuzhuo Zhao, Dalian (CN); Tao Liu, Dalian (CN); Bingbing Guo, Dalian (CN); Xiaobing Huang, Dalian (CN); Genhai Xuan, Dalian (CN); Tong Xu, Dalian (CN); Jingjing Wang, Dalian (CN)

(73) Assignees: CHINA PETROLEUM & CHEMICAL CORPORATION, Beijing (CN); SINOPEC Dalian Research Institute of Petroleum and Petrochemicals Co., Ltd., Dalian (CN)

( * ) Notice: Subject to any disclaimer, the term of this patent is extended or adjusted under 35 U.S.C. 154(b) by 796 days.

(21) Appl. No.: 18/249,927

(22) PCT Filed: Oct. 21, 2021

(86) PCT No.: PCT/CN2021/125272

§ 371 (c)(1),
(2) Date: Apr. 20, 2023

(87) PCT Pub. No.: WO2022/083688

PCT Pub. Date: Apr. 28, 2022

(65) Prior Publication Data

US 2023/0381728 A1 Nov. 30, 2023

(30) Foreign Application Priority Data

Oct. 21, 2020 (CN) ........................ 202011133041.X

(51) Int. Cl.
*B01J 8/02* (2006.01)

(52) U.S. Cl.
CPC ........... *B01J 8/0257* (2013.01); *B01J 8/0278* (2013.01); *B01J 2208/0084* (2013.01); *B01J 2208/00938* (2013.01); *B01J 2208/027* (2013.01)

(58) Field of Classification Search
CPC ........ B01D 3/008; B01D 3/009; B01D 3/141; B01D 3/24; B01J 8/0257; B01J 8/0278;
(Continued)

(56) References Cited

U.S. PATENT DOCUMENTS

| | | | |
|---|---|---|---|
| 2,260,153 | A | 10/1941 | Nofsinger |
| 4,471,154 | A | 9/1984 | Franklin |

(Continued)

FOREIGN PATENT DOCUMENTS

| | | | |
|---|---|---|---|
| CN | 1281744 | A | 1/2001 |
| CN | 1345617 | A | 4/2002 |

(Continued)

OTHER PUBLICATIONS

Machine Translation CN 1386560A (Year: 2026).*
Machine Translation CN 203609903U (Year: 2026).*
Machine Translation JP 2011218307A (Year: 2026).*

*Primary Examiner* — Dapinder Singh
(74) *Attorney, Agent, or Firm* — NKL Law; Allen Xue

(57) ABSTRACT

A catalytic reaction unit has a plurality of catalyst bed layers arranged vertically, each of the catalyst bed layers being filled with a solid catalyst, and an inclined surface on the upper part of the corresponding solid catalyst arranged between adjacent catalyst bed layers; a liquid phase feeding subunit arranged above the topmost catalyst bed layer, and the liquid phase feed is guided by the inclined surface to sequentially enter each catalyst bed layer from top to bottom; a gas phase feeding subunit arranged between the
(Continued)

catalyst bed layer of an upper layer and the inclined surface of the next layer, and a gas phase channel relatively isolated from the gas phase feeding subunit. The gas phase product generated after the gas-phase feed and the liquid phase feed react in the catalyst bed layer directly enters the gas phase channel.

11 Claims, 4 Drawing Sheets

(58) Field of Classification Search
CPC .................... B01J 8/0465; B01J 8/0492; B01J 2208/0084; B01J 2208/00911; B01J 2208/027; Y02P 20/10
See application file for complete search history.

(56) References Cited

U.S. PATENT DOCUMENTS

| | | | | |
|---|---|---|---|---|
| 4,743,433 | A | 5/1988 | Smith | |
| 5,013,407 | A | 5/1991 | Nocca et al. | |
| 5,130,102 | A | 7/1992 | Jones, Jr. | |
| 6,723,886 | B2 | 4/2004 | Allison et al. | |
| 8,685,334 | B2 * | 4/2014 | Wonders | B01J 8/1872 422/231 |
| 9,162,207 | B2 * | 10/2015 | Jia | B01J 35/66 |
| 12,246,972 | B2 * | 3/2025 | Zhou | C02F 1/5236 |
| 12,251,657 | B2 * | 3/2025 | Panaccione | B01D 47/14 |
| 2011/0210457 | A1 | 9/2011 | Nakayama | |
| 2021/0129160 | A1 * | 5/2021 | Rubow | B01D 45/16 |

FOREIGN PATENT DOCUMENTS

| | | | |
|---|---|---|---|
| CN | 2503959 | Y | 8/2002 |
| CN | 1386560 | A | 12/2002 |
| CN | 1429656 | A | 7/2003 |
| CN | 101391150 | A | 3/2009 |
| CN | 101778666 | A | 7/2010 |
| CN | 102671580 | A | 9/2012 |
| CN | 102824752 | A | 12/2012 |
| CN | 203609903 | U | 5/2014 |
| CN | 104203388 | A | 12/2014 |
| CN | 104694150 | A | 6/2015 |
| EP | 2815810 | A1 | 12/2014 |
| FR | 1049454 | A | 12/1953 |
| GB | 1049073 | A | 11/1966 |
| JP | 2011218307 | A * | 11/2011 |
| KR | 100172960 | B1 | 2/1999 |
| RU | 2446872 | C2 | 4/2012 |
| RU | 195503 | U1 | 1/2020 |
| SU | 463455 | A1 | 3/1975 |

* cited by examiner

CATALYTIC REACTION UNIT AND REACTIVE DISTILLATION COLUMN

CROSS REFERENCE TO RELATED APPLICATIONS

This application is a U.S. national stage entry of PCT International Application No PCT/CN2021/125272, filed on Oct. 21, 2021, which claims for the priority of the Chinese Patent Application No. 202011133041.X filed on Oct. 21, 2020, the content of which is incorporated herein by reference in its entirety.

FIELD

The present disclosure relates to the field of petrochemical industry, in particular to a catalytic reaction unit and a reactive distillation column using the catalytic reaction unit.

BACKGROUND

Catalytic distillation originated from the chemical industry, is used to accomplish catalytic reaction and distillation operations in the same container, and it has advantages such as energy saving, high efficiency and high economic efficiency, etc. The catalytic distillation technique has been widely applied in the chemical industry owing to its advantages. Early in the 1960s, American enterprises began to use the ideal of catalytic distillation to solve the problem that it was difficult to separate mixtures containing normal olefins, isomeric olefins and alkanes by conventional distillation because of the similar boiling points. Later, based on the characteristics of different reactions, various catalytic distillation apparatuses came into being. For example, there are catalytic distillation apparatuses having a difunctional structure, in which a distillation function is arranged on the left, while a reaction function is arranged on the right, i.e., a left chamber has a distillation function, and is equipped with distillation plates; a right chamber has a reaction function, and is filled with a catalyst required for the reaction, and the left chamber and the right chamber are separated from each other by a partition. For another example, there are catalytic distillation apparatuses having a vertical structure, which are more common; here, the vertical structure refers to the relative arrangement of the reaction zone and the distillation zone. A catalytic distillation apparatus having a vertical structure for preparing methanol from a synthetic gas has been disclosed in the U.S. Pat. No. 6,723,886B2. The apparatus has a plurality of fixed bed layers therein, and the diameter of the reaction zone may vary at different heights; whether the reaction zone is filled with a catalyst and the thickness of the filled catalyst can be determined according to the actual circumstance; an external heat exchanger, a dehydration device, or a paraffin separation device and reflux side lines may be arranged at the side lines at different positions; and the outside of the entire catalytic distillation apparatus may be surrounded by a separate cooling device.

In view of the existence of gas phase components in the product, a concept of gas channel is put forward in the industry to enable the gas to pass through the catalyst bed layers more easily. For example, a gas channel may be embedded in the middle part of the catalytic distillation apparatus. The gas passage enables the gas phase in the lower bed layer to directly go to the upper distillation plate layer for mass transfer without being blocked by the catalyst bed layer. Alternatively, a plurality of gas channels may be arranged in the catalytic distillation apparatus. A catalytic distillation column is a columnar outer cylinder that is closed at the top and the bottom, with a plurality of cylindrical gas channels perpendicular to the cross section arranged therein; the gas channels are embedded in the reaction zone, and the terminals of the channels are in communication with the open areas of a rectifying section and a stripping section or the media in these sections; the outer cylinder of the reaction zone is filled with a high-density catalyst, and the wall of the inner cylinder may be perforated to enable close contact with the catalyst.

In summary, the existing catalytic distillation technique itself improves the reaction efficiency and the separation of the product. In the application of the catalytic distillation technique, there are various forms of reactors and internal components inside the reactors. However, it is necessary to further improve the efficiency of the existing reactors and internal components; especially, the problem of separating the gas phase reaction product from the reaction zone timely still can't be solved effectively in the prior art. Therefore, there is an urgent need for a catalytic reaction unit and a distillation column using the catalytic reaction unit that have solved the separation efficiency problem in the prior art. In addition, with the catalytic reaction unit and the distillation column, the gas phase product can still be separated efficiently even if the gas phase product has secondary reactions.

The information disclosed in this section is only intended to make the background of the present disclosure understood better, and should not be deemed as acknowledging or implying in any form that the information constitutes the prior art well known to those having ordinary skills in the art.

SUMMARY

An object of the present disclosure is to provide a catalytic reaction unit and a distillation column using the catalytic reaction unit, so as to overcome the drawback that the gas phase reaction product can't be separated timely from the reaction zone in the prior art; especially, with the catalytic reaction unit and the distillation column, the gas phase product can still be separated efficiently even if the gas phase product has secondary reactions.

To attain the object described above, in a first aspect, the present disclosure provides a catalytic reaction unit, which comprises: a plurality of catalyst bed layers arranged vertically, each of the catalyst bed layers being filled with a solid catalyst respectively, and an inclined surface on an upper part of the corresponding solid catalyst being arranged between adjacent catalyst bed layers; a liquid phase feeding subunit, which is arranged above a topmost catalyst bed layer, so that a liquid phase feed can be introduced into the catalyst bed layer, and the liquid phase feed is guided by the inclined surface to sequentially enter each catalyst bed layer from top to bottom; a gas phase feeding subunit, which is arranged between the catalyst bed layer of an upper layer and the inclined surface of the next layer, a gas phase feed of each layer entering the catalyst bed layer in an upward manner; and a gas phase channel, which is relatively isolated from the gas phase feeding subunit, and a gas phase product generated by reaction of the gas phase feed to the liquid phase feed in the catalyst bed layer directly entering the gas phase channel.

Preferably, the inclined surface as a whole is an umbrella-shaped partition.

Preferably, a tail end of the umbrella-shaped partition is provided with an annular downcomer, and the bottom of the annular downcomer is spaced apart from the bottom of the corresponding catalyst bed layer by a certain distance, so that the liquid phase feed enters the catalyst bed layer in a radial direction.

Preferably, the liquid phase feeding subunit comprises: a liquid phase feed pipe extending in the radial direction of the catalytic reaction unit; and a liquid phase distribution pipe, which is annular and orthogonal or tangential to the liquid phase feed pipe, wherein a pipe wall of the liquid phase distribution pipe is provided with a plurality of pores for uniformly distributing the liquid phase feed to the annular downcomer in all directions.

Preferably, the catalyst bed layer is provided with: an overflow weir arranged at a side near the gas phase channel; and a liquid-sealing baffle arranged at the upper part of the overflow weir and configured to isolate the gas phase feed from the gas phase product.

Preferably, the liquid-sealing baffle comprises: a horizontal part, which is in an annular flat plate shape and disposed above the overflow weir; and a vertical part, which is in a cylindrical shape and is integrally formed with the horizontal part, with a lower end of the vertical part spaced apart from the bottom of the catalyst bed layer by a certain distance.

Preferably, the top edge of the overflow weir is higher than the top surface of the catalyst in the bed layer by 10-100 mm.

Preferably, the gas phase feeding subunit comprises: a gas phase feed pipe extending in the radial direction of the catalytic reaction unit; and a gas phase distribution pipe, which is in an annular shape or multi-layer concentric ring shape, and is orthogonal or tangential to the gas phase feed pipe, with a wall surface of the gas phase distribution pipe provided with a plurality of pores for uniformly distributing the gas phase feed to the bottom of the catalyst bed layer in all directions.

Preferably, the gas phase feeding subunit further comprises: a gas phase distribution disk, which is disposed at the bottom of the catalyst bed layer and is generally in a disk shape, with a plurality of pores distributed uniformly and densely in the gas phase distribution disk.

Preferably, the gas phase distribution pipe is disposed below or inside the catalyst bed layer.

Preferably, the gas phase channel is disposed in the middle of the catalytic reaction unit and extends through all the catalyst bed layers from bottom to top.

Preferably, the height of each catalyst bed layer is set to 10 mm-1,000 mm.

In the above technical scheme, the top edge of the overflow weir may be higher than the top surface of the catalyst in the bed layer by 10-100 mm. The gas phase distribution pipe may be disposed below or inside the catalyst bed layer.

In another aspect, the present disclosure provides a reactive distillation column using the aforesaid catalytic reaction unit, wherein the reactive distillation column has a multi-layer plate tower structure.

The reactive distillation column is applicable to a reaction system in which at least one liquid phase feed and at least one gas phase feed have chemical reactions on a solid catalyst and at least one of the reaction products is a gas phase product.

Compared with the prior art, the present disclosure attains the following beneficial effects:

1) In the present disclosure, the gas phase product generated by the chemical reaction of the reactants in the catalyst bed layers leaves the reaction zone timely and doesn't enter the upper catalyst bed layers; thus, any secondary reaction of the target product is avoided, and the selectivity of the reaction is improved;
2) Since the gas-phase product in the reaction zone leaves the reaction zone timely, the driving force of the reaction is increased, and the equilibrium conversion ratio is improved;
3) The umbrella-shaped partition can separate the gas phase feed from the product gas between adjacent bed layers on one hand, and can guide the liquid phase flow and the gas phase flow on the other hand;
4) The liquid-sealing baffle can isolate the gas phase feed from the gas phase product effectively;
5) The gas phase distribution pipe in a multi-layer concentric ring shape maximizes the uniformity of distribution of the gas phase feed;
6) The catalytic reaction unit provided by the present disclosure is applicable to a reaction system in which at least one liquid phase feed and at least one gas phase feed have chemical reactions on a solid catalyst and at least one of the reaction products is a gas phase product.

The above description is only a summary of the technical scheme of the present disclosure. Hereunder one or more preferred embodiments will be presented and described with reference to the accompanying drawings in detail, in order to make the technical means of the present disclosure understood more clearly and implemented on the basis of the description, and make the above-mentioned and other objects, technical features and advantages of the present disclosure understood more easily.

REFERENCE NUMBERS

Figure 1:
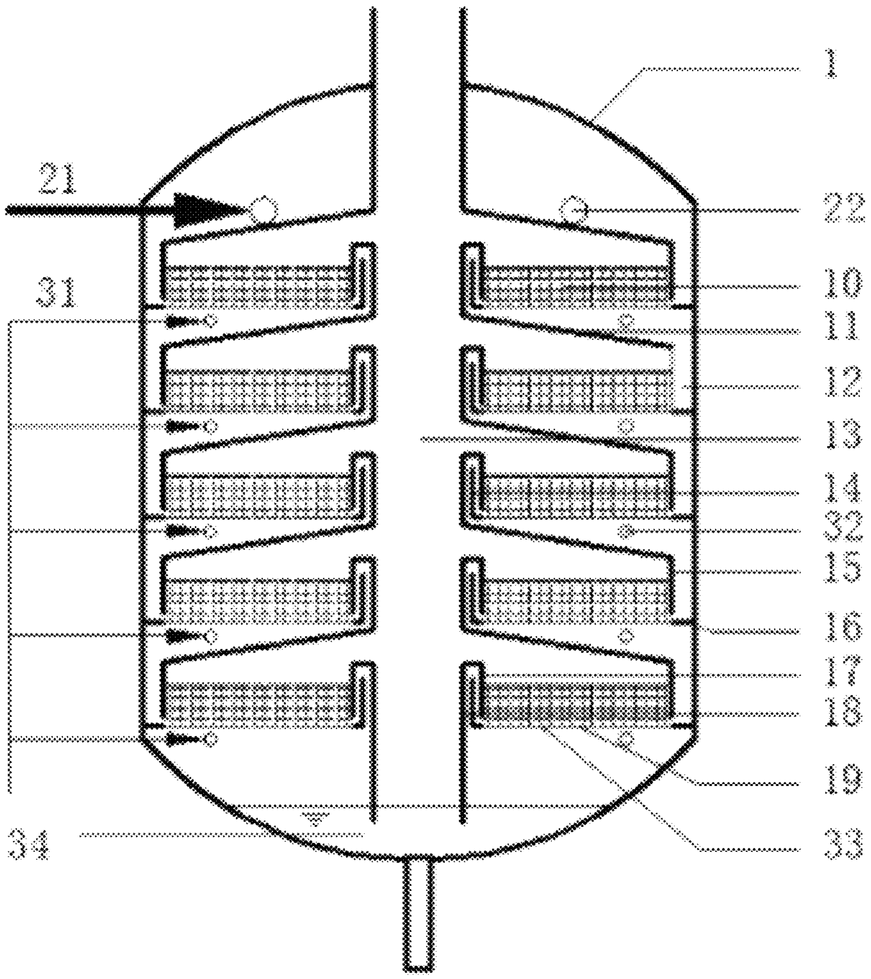
FIG. 1 is a schematic structural diagram of the catalytic reaction unit and the reactive distillation column in the present disclosure.

1—reactive distillation column, 10—solid catalyst, 11—umbrella-shaped partition, 12—outer downcomer, 13—gas phase channel, 14—overflow weir, 15—downcomer flap, 16—liquid receiving tray, 17—liquid-sealing baffle, 18—inner downcomer, 19—catalyst supporting tray, 191—grating;
21—liquid phase feed pipe, 22—liquid phase distribution pipe, 220—liquid phase distribution pipe body, 221—liquid phase pore channel;

31—gas phase feed pipe; 32—gas phase distribution pipe; 320—gas phase distribution pipe body, 321—gas phase pore channel, 33—gas phase distribution disk, 331—pore.

DETAILED DESCRIPTION

Hereunder some specific embodiments of the present disclosure will be detailed with reference to the accompanying drawings. However, it should be understood that the scope of protection of the present disclosure is not limited to those embodiments.

Unless otherwise expressly stated, throughout the specification and claims, the term "comprise" or "include" or their variants such as "comprising" or "including" shall be understood as including the enumerated elements or components, without excluding other elements or components.

In this document, for the convenience of description, spatially relative terms such as "underside", "below", "bottom", "upside", "above", and "top", etc., may be used to describe the relationship between one element or feature and another element or feature in the drawings. It should be understood that the spatially relative terms are intended to include different directions of the objects in use or operation other than the directions depicted in the drawings. For example, if an object in a drawing is turned upside down, an element described as "below" or "downside" other elements or features will be oriented "above" the elements or features. Therefore, the exemplary term "below" may include "below" and "above" directions. Objects may also have other orientations (rotated by 90 degrees or other orientations), and the spatially relative terms used herein should be interpreted accordingly.

In this document, the terms "first", "second", etc. are used to distinguish two different elements or parts, rather than to define a specific position or relative relationship. In other words, in some embodiments, the terms "first", "second", etc. may also be interchanged with each other.

As shown in FIG. 1, the catalytic reaction unit in the present disclosure is an internal component of a reactive distillation column 1, and comprises a plurality of catalyst bed layers, a liquid phase feeding subunit, a gas phase feeding subunit, and a gas phase channel. The catalytic reaction unit may be provided with two or more catalyst bed layers, each of which is filled with a solid catalyst 10, an inclined surface on the upper part of the corresponding solid catalyst 10 (i.e., the solid catalyst in the lower catalyst bed layer) is arranged between adjacent catalyst bed layers, the inclined surface may be generally in an umbrella shape and serves as a partition, which can separate the gas phase feed from the product gas between adjacent catalyst bed layers on one hand, and guides the liquid phase flow and the gas phase flow on the other hand; preferably, but not limitingly, the surface of the umbrella may be in an arc shape, or the umbrella may be a telescopic umbrella. The liquid phase feeding subunit is arranged above the inclined surface (i.e., the umbrella-shaped partition 11) of the topmost catalyst bed layer, a liquid phase feed is guided by the inclined surface of the umbrella-shaped partition 11 to the catalyst bed layer and contacts with the solid catalyst 10; specifically, the tail end of the umbrella-shaped partition 11 is provided with an annular outer downcomer 12 (i.e., the annular space between the downcomer flap 15 and the inner wall surface of the reactive distillation column 1 in FIG. 1), and the bottom of the outer downcomer 12 is spaced apart from the bottom of the catalyst bed layer by a certain distance, so that the liquid phase feed enters the catalyst bed layer in the radial direction of the reactive distillation column 1. A gas phase feeding subunit is arranged at each catalyst bed layer; specifically, the gas phase feeding subunit is arranged between the catalyst bed layer of an upper layer and the umbrella-shaped partition 11 of the next layer, and the gas phase feed at each layer enters the catalyst bed layer upwardly. After the gas phase feed and the liquid phase feed react fully in the presence of the solid catalyst 10 in a catalyst bed layer, the gas phase product in each layer is guided along the lower part of the umbrella-shaped partition 11 to a gas phase channel 13. The gas phase channel 13 is relatively isolated from the gas phase feeding subunit, i.e., the gas phase product generated by reaction of the gas phase feed to the liquid phase feed in the catalyst bed layer directly enters the gas phase channel 13. Preferably, but not limitingly, the gas phase channel is located in the middle of the reactive distillation column 1, and extends through all the catalyst bed layers from bottom to top.

Figure 2:
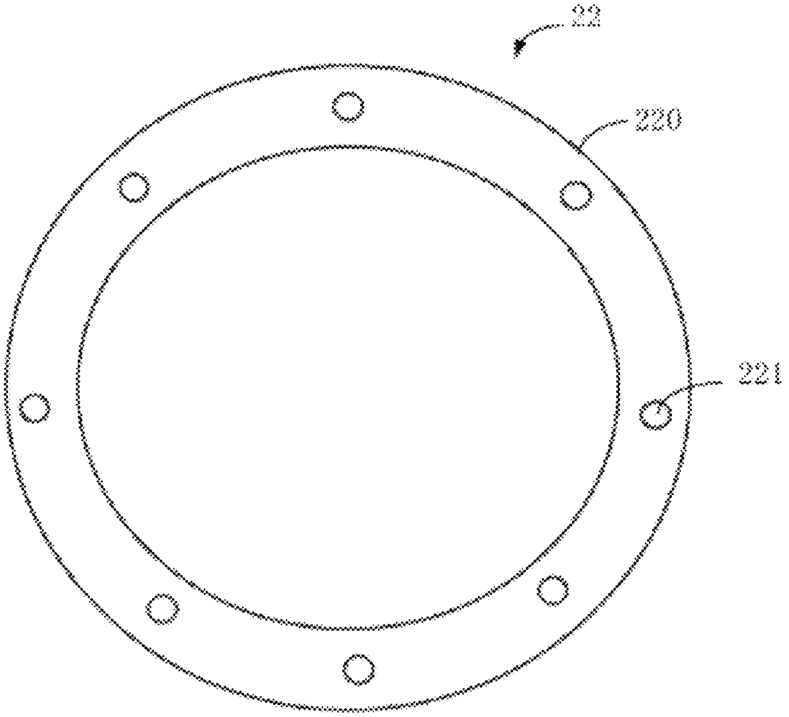
FIG. 2 is a top view of the liquid phase distribution pipe in the catalytic reaction unit in the present disclosure.
Figure 3:
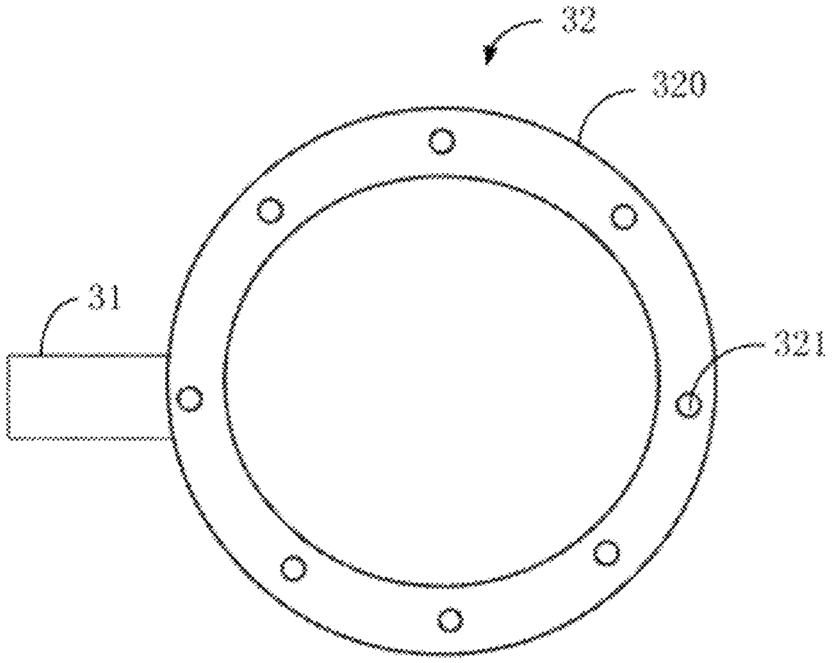
FIG. 3 is a top view of the gas phase feed pipe and the gas phase distribution pipe in the catalytic reaction unit in the present disclosure (showing that the gas phase feed pipe is orthogonal to the annular gas phase distribution pipe)
Figure 4:
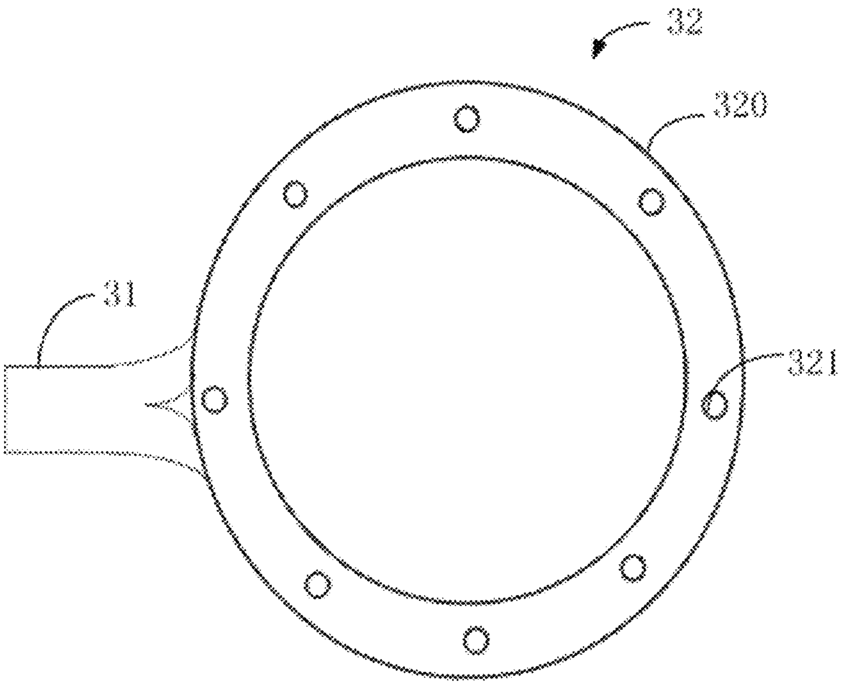
FIG. 4 is another top view of the gas phase feed pipe and the gas phase distribution pipe in the catalytic reaction unit in the present disclosure (showing that the gas phase feed pipe is tangential to the annular gas phase distribution pipe)
Figure 5:
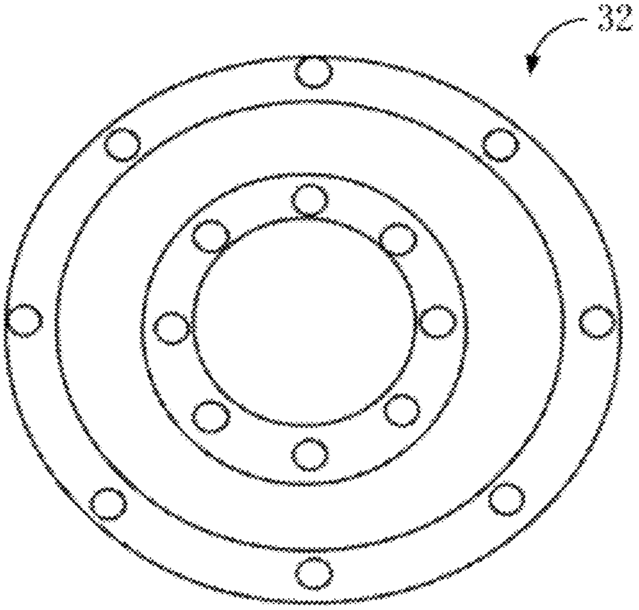
FIG. 5 is a top view of the gas phase distribution pipe in a double concentric ring shape in the present disclosure.

Furthermore, as shown in FIGS. 1 and 2, the liquid phase feeding subunit further comprises a liquid phase feed pipe 21 and a liquid phase distribution pipe 22. The liquid phase feed pipe 21 extends in the radial direction of the catalytic reaction unit, is annular, and is orthogonal or tangential to the pipe body 220 of the liquid phase distribution pipe 22; the pipe wall of the liquid phase distribution pipe 22 is provided with a plurality of pore channels 221 for uniformly distributing the liquid phase feed to the annular outer downcomer 12 in all directions. The openings of the pore channels 221 may be in the top surface, bottom surface, and side surface of the pipe body in various directions. The liquid phase feed enters the reactive distillation column 1 through the liquid phase feed pipe 21, is distributed through the annular liquid phase distribution pipe 22 into the tower, flows via the umbrella-shaped partition 11 to the periphery and into the outer downcomer 12, and then enters into the catalyst bed layer horizontally to contact with the solid catalyst 10. The feeding direction of the liquid phase feed pipe 21 is the radial direction of the reactive distillation column and orthogonal or tangential to the radial direction of the annular liquid phase distribution pipe 22; the ring diameter of the annular liquid phase distribution pipe 22 is greater than the outer diameter of the gas phase channel 13 but smaller than the inner diameter of the reactive distillation column 1; and the pipe wall of the annular liquid phase distribution pipe 22 is provided with several pores to facilitate distributing the liquid phase feed uniformly in all directions of the outer downcomer 12. The height of the downcomer flap 15 is usually smaller than the catalyst packing height in the layer, and the distance of the downcomer flap 15 from the inner wall of the reactive distillation column 1 is determined according to the flow rate of the liquid-phase reactant in the layer.

Furthermore, as shown in FIG. 1, the catalyst bed layers in the reactive distillation column 1 may have the same height or different heights, depending on the specific chemical reaction system; the top part of each catalyst bed layer is fixed with a mesh to keep the bed layer relatively stable, and the height of the bed layers is set to 10 mm-1,000 mm. Each catalyst bed layer is provided with an overflow weir 14 and a liquid-sealing baffle 17, and the overflow weir 14 is disposed at the side near the gas phase channel 13. The liquid-sealing baffle 17 is disposed at the upper part of the overflow weir 14 and configured to isolate the gas phase feed from the gas phase product. Furthermore, the liquid-sealing baffle 17 comprises a horizontal part and a vertical part, wherein the horizontal part is in an annular flat plate shape and disposed above the overflow weir 14; the vertical part is in a cylindrical shape, and is integrally formed with the horizontal part or otherwise seamlessly connected to the horizontal part; the lower end of the vertical part is spaced apart from the bottom of the catalyst bed layer by a certain distance to ensure the outflow of the liquid phase product. The unreacted liquid phase feed and the material that has reacted but remains in the liquid phase in the catalyst bed layer flow through the overflow weir 14 and the inner downcomer 18 (i.e., an annular space between the overflow weir 14 and the outer wall of the gas phase channel 13), and flow along the umbrella-shaped partition 11 through the outer downcomer 12 of the next layer and enter the next catalyst bed layer. The overflow weir 14 is higher than the top flat surface of the catalyst in the bed layer, preferably is higher by 10-100 mm. The spacing of the annular inner downcomer 18 formed between the overflow weir 14 and the outer wall of the gas phase channel 13 may be determined according to the liquid phase load, and the downcomer of each bed layer may have the same dimensions or different dimensions.

Figure 6:
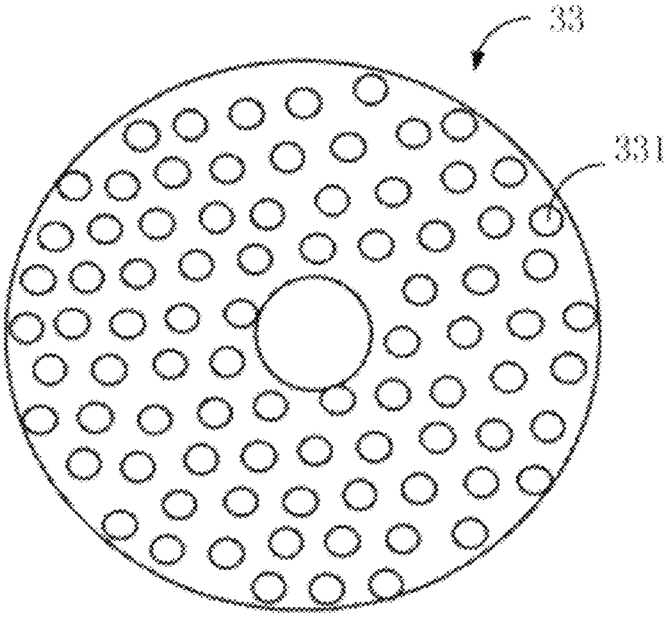
FIG. 6 is a top view of the gas phase distribution disk in the catalytic reaction unit in the present disclosure.
Figure 7:
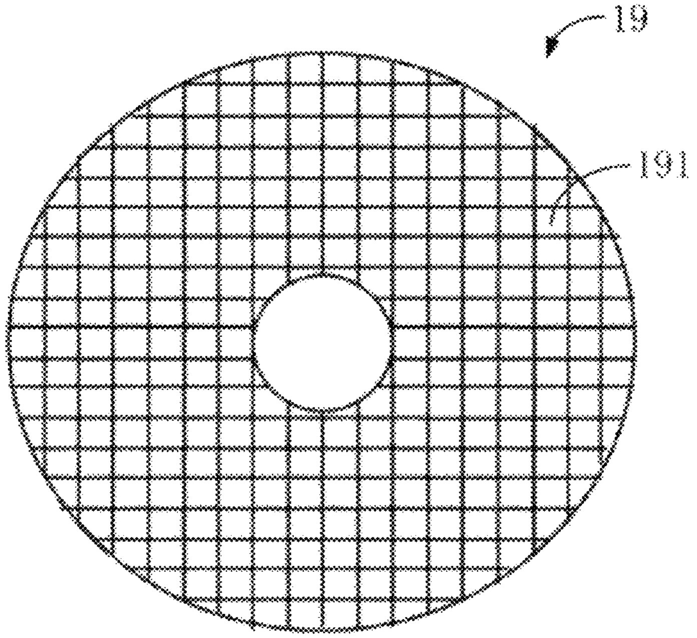
FIG. 7 is a top view of the catalyst supporting tray in the catalytic reaction unit in the present disclosure.

Furthermore, as shown in FIGS. 1 and 3-5, the gas phase feeding subunit comprises a gas phase feed pipe 31 and a gas phase distribution pipe 32, wherein the gas phase feed pipe 31 extends in the radial direction of the reactive distillation column 1; the gas phase distribution pipe 32 is in an annular shape (see FIGS. 3 and 4) or multi-layer concentric ring shape (see the two-layer concentric ring in FIG. 5); the gas phase feed pipe 31 is orthogonal to the pipe body 320 of the gas phase distribution pipe 32 (see FIG. 3) or tangential to the pipe body 320 of the gas phase distribution pipe 32 (see FIG. 4); the wall surface of the gas phase distribution pipe 32 is provided with a plurality of pore channels 321 for uniformly distributing the gas phase feed to the bottom of the catalyst bed layer in all directions. Preferably, but not limitingly, the gas phase distribution pipe 32 may be disposed below or inside the catalyst bed layer. Furthermore, as shown in FIG. 6, the gas phase feeding subunit further comprises a gas phase distribution disk 33, which is disposed at the bottom of the catalyst bed layer and is generally in a disk shape, and a plurality of pores 331 are distributed uniformly and densely in the gas phase distribution disk. The gas phase feed enters the reactive distillation column 1 through the gas phase feed pipe 31 in each layer, is distributed through the annular gas phase distribution pipe 32 into the reactive distillation column 1, and enter upward through the gas phase distribution disk 33 at the lower part of the catalyst supporting tray 19 into the catalyst bed layer. The gas phase feed pipe 31 enters the reactive distillation column 1 in the radial direction, and is orthogonal or tangential to the annular gas phase distribution pipe 32; the annular gas phase distribution pipe 32 is disposed below the catalyst bed layer, the ring diameter of the annular gas phase distribution pipe 32 is smaller than the diameter of the outer ring of the catalyst bed layer, the inner diameter of the annular gas phase distribution pipe 32 is greater than the diameter of the inner ring of the catalyst bed layer, and the pipe wall of the annular gas phase distribution pipe 32 is provided with several pore channels 321 to facilitate distributing the gas uniformly to all positions of the gas phase distribution disk 33. The main function of the catalyst supporting tray 19 is to support the catalyst bed layer and ensure that the catalyst bed layer is kept stable in the axial direction of the reactive distillation column. The function of the gas phase distribution disk 33 is to ensure uniform distribution of the gas phase feed and avoid direct leakage of the liquid phase feed on the catalyst bed layer as far as possible (with the gas phase distribution disk 33 in the present disclosure, the liquid leakage is less than 15%). The distribution of the gas phase feed will be more uniform if two or more annular gas phase distribution pipes 32 that are concentric but have different diameters are arranged in the same plane. In the embodiment shown in FIG. 1, the annular gas phase distribution pipe 32 is disposed below the catalyst bed layer; in the case that the annular gas phase distribution pipe 32 is mounted inside the catalyst bed layer, the catalyst supporting tray 19 may be modified from the grating 191 in FIG. 7 to a supporting plate, and the gas phase distribution disk 33 may be omitted at the same time.

In the catalyst bed layer of the catalytic reaction unit in the present disclosure, the liquid phase feed and the gas phase feed have a catalytic reaction, the gas-phase product and the unreacted gas phase feed rise up through the gas phase channel 13 and escape from the reaction system, and the gas phase product generated after the chemical reaction of the reactants in the catalyst bed layer leaves the reaction zone timely and doesn't enter the upper catalyst bed layer (isolated by the umbrella-shaped partition), thereby any secondary reaction of the target product is avoided, and the selectivity of the reaction is improved. Besides, since the gas-phase product in the reaction zone leaves the reaction zone timely, the driving force of the reaction is increased, and the equilibrium conversion ratio is improved.

The reactive distillation column in the present disclosure uses the catalytic reaction unit described above, and the reactive distillation column 1 may have a multi-layer plate tower structure. Two or more catalyst bed layers may be provided in the reactive distillation column. The reactive distillation column 1 in the present disclosure is applicable to a reaction system in which at least one liquid phase feed and at least one gas phase feed have chemical reactions on a solid catalyst and at least one of the reaction products is a gas phase product, for example, hydrocracking of petroleum fractions and chemical synthetic oils, hydro-dewaxing of diesel and lube oil distillates, and hydrotreating of various petroleum fractions, etc.

In the reactive distillation column 1 in the present disclosure, each column tray is provided with a liquid-sealing baffle connected to the gas phase channel, besides the downcomer, the overflow weir and the liquid receiving tray 16; adjacent column trays are separated by an umbrella-shaped partition; and each layer of column tray has an annular structure, with an inner edge connected to the gas phase channel and an outer edge connected to the inner wall of the reactive distillation column. The gas phase channel is a common channel for transporting out the gas-phase product generated in the chemical reaction on each layer of column tray. In the embodiment of the present disclosure, all liquid phase feed positions are arranged at the upper part of one layer of column tray or arranged on some or all layers of column trays; and a gas phase feed position is arranged at the bottom of each layer. The space above each layer of column tray is a catalyst loading area, the liquid phase feed flows through the catalyst bed layer in the radial direction, the gas phase feed enters the reactive distillation column 1 from the bottom of the column tray, and the liquid phase feed and the gas phase feed react under the action of the catalyst; the gas phase material generated through the reaction directly leaves the reaction system and enters the gas phase channel in the middle part, the liquid phase material leaves the bed layer and then enters the next bed layer through the downcomer, and may be discharged through a drain port (not shown) arranged at the bottom of the reactive distillation column 1. Since the reaction and the separation happen at the same time, the reaction equilibrium can be destroyed, and the conversion efficiency of the reactants and the selectivity of the target product can be improved effectively.

Example 1

The catalytic reaction unit in the present disclosure is applied in a hydrocracking reactor for the catalytic hydrocracking process of diesel oil, and a pre-refining reactor is connected in series upstream of the cracking reactor process for removing the impurities in the raw oil. The catalyst is the same catalyst applied in similar industrial apparatuses. The yield of the gasoline fraction in the cracked product is 50.1%, the gasoline octane number RON is 88.2, and the liquid yield is 91.1%.

Operating Conditions and Result:

Density of catalytic diesel oil: 0.9464 g·cm$^{-3}$, distillation range: 168-370° C.;

Purity of hydrogen: 99.9%;

Nitrogen content in the refined oil: 70-100 mg·kg$^{-3}$;

Operating pressure of the catalytic distillation column: 4.0 MPa;

Number of catalyst bed layers in the catalytic distillation column: 1;

Liquid hourly space velocity (LHSV) in cracking: 1.5 h$^{-1}$;

Volume ratio of hydrogen to oil: 700:1;

Average reaction temperature: 350-360° C.;

Yield of gasoline fractions: 50.1%; gasoline octane number RON: 88.2; liquid yield: 91.1%.

Example 2

The catalytic reaction unit in the present disclosure is applied in a hydrocracking reactor for the catalytic hydrocracking process of diesel oil, and a pre-refining reactor is connected in series upstream of the cracking reactor process for removing the impurities in the raw oil. The catalyst is the same catalyst applied in similar industrial apparatuses, and is fixed on the bed layers with a stainless steel mesh. The yield of the gasoline fraction in the cracked product is 54.1%, the gasoline octane number RON is 93.3, and the liquid yield is 98.2%.

Operating Conditions and Result:

Density of catalytic diesel oil: 0.9464 g·cm$^{-3}$, distillation range: 168-370° C.;

Purity of hydrogen: 99.9%;

Nitrogen content in the refined oil: 70-100 mg·kg$^{-3}$;

Operating pressure of the catalytic distillation column: 4.0 MPa;

Number of catalyst bed layers in the catalytic distillation column: 10;

Liquid hourly space velocity (LHSV) in cracking: 1.5 h$^{-1}$;

The load of the downcomer in the first layer is designed with 60%-130% operating flexibility according to the feed rate;

The gas phase feed load in each layer is the same (or the gas phase flow rate may be controlled according to the liquid phase load in each layer);

The diameter of the gas phase channel is the same from top to bottom (or the diameter may be greater at the upper part and smaller at the lower part);

Volume ratio of hydrogen to oil: 700:1;

Average reaction temperature: 350-360° C.;

Yield of gasoline fractions: 54.1%; gasoline octane number RON: 93.3; liquid yield: 98.2%. Compared with the single bed layer in the Example 1, the effect of the present disclosure is more apparent with 10 catalyst bed layers.

Example 3

The catalytic reaction unit in the present disclosure is applied in a hydrocracking reactor for the catalytic hydrocracking process of diesel oil, and a pre-refining reactor is connected in series upstream of the cracking reactor process for removing the impurities in the raw oil. The catalyst is the same catalyst applied in similar industrial apparatuses, and is fixed on the bed layers with a stainless steel mesh. The yield of the gasoline fractions is 55.3%, the gasoline octane number RON is 93.1, and the liquid yield is 98.6%.

Operating Conditions and Result:

Density of catalytic diesel oil: 0.9464 g·cm$^{-3}$, distillation range: 168-370° C.;

Nitrogen content in the refined oil: 70-100 mg·kg$^{-3}$;

Operating pressure of the catalytic distillation column: 6.0 MPa;

Number of catalyst bed layers in the catalytic distillation column: 10;

Liquid hourly space velocity (LHSV): 1.5 h$^{-1}$;

The load of the downcomer in the first layer is designed with 60%-130% operating flexibility according to the feed rate;

The gas phase feed load in each layer is the same (or the gas phase flow rate may be controlled according to the liquid phase load in each layer);

The diameter of the gas phase channel is the same from top to bottom (or the diameter may be greater at the upper part and smaller at the lower part);

Volume ratio of hydrogen to oil: 800:1;

Average reaction temperature: 360-380° C.;

Yield of gasoline fractions: 55.3%; gasoline octane number RON: 93.1; liquid yield: 98.6%.

Example 4

The catalytic reaction unit in the present disclosure is applied in a hydrocracking reactor for the catalytic hydrocracking process of VGO, and a pre-refining reactor is connected in series upstream of the cracking reactor process for removing the impurities in the raw oil. The catalyst is the same catalyst applied in similar industrial apparatuses, and is fixed on the bed layers with a stainless steel mesh. The yield of the heavy naphtha fraction is 48.5%, the aromatic content in the heavy naphtha is 33.1%, and the liquid yield is 98.8%.

Operating Conditions and Result:

Density of catalytic diesel oil: 0.9047 g·cm$^{-3}$, distillation range: 258-532° C.;

Nitrogen content in the refined oil: 50 mg·kg$^{-3}$;

Operating pressure of the catalytic distillation column: 12.0 MPa;

Number of catalyst bed layers in the catalytic distillation column: 10;

Liquid hourly space velocity (LHSV): 1.4 h$^{-1}$;

The load of the downcomer in the first layer is designed with 60%-130% operating flexibility according to the feed rate;

The gas phase feed load in each layer is the same (or the gas phase flow rate may be controlled according to the liquid phase load in each layer);

The diameter of the gas phase channel is the same from top to bottom (or the diameter may be greater at the upper part and smaller at the lower part);

Volume ratio of hydrogen to oil: 1,200:1;

Average reaction temperature: 360-380° C.;

Yield of the heavy naphtha fraction: 48.5%; aromatic content in the heavy naphtha: 33.1%, liquid yield: 98.8%.

The above description of the specific embodiments of the present disclosure is for the purpose of explanation and illustration. The description is not intended to limit the present disclosure to the disclosed specific forms; moreover, it is obvious that various modifications and alternations can be made in light of the above teaching. The exemplary embodiments are selected and described in order to explain the specific principle of the present disclosure and its practical application, so as to enable those skilled in the art to implement and utilize the exemplary embodiments of the present disclosure and make various choices and changes. Any simple modification, equivalent variation or refinement made to the above exemplary embodiments shall be deemed as falling in the scope of protection of the present disclosure.

The invention claimed is:

1. A catalytic reaction unit, comprising:

a plurality of catalyst bed layers that are arranged vertically inside a housing, each of the catalyst bed layers comprises a layer of solid catalyst, and an inclined surface disposed above the layer of solid catalyst;

a liquid phase feeding subunit disposed above a topmost catalyst bed layer, configured to introduce a liquid phase feed into the each of catalyst bed layers from top to bottom, and wherein the liquid phase feed is guided by the inclined surface into the layer of solid catalyst in the corresponding catalyst bed layer;

a gas phase feeding subunit having a plurality of gas inlets to introduce a gas phase feed into the housing, each gas inlet is disposed between a upper catalyst bed layer and a lower catalyst bed layer that are adjacent to each other, a gas phase channel connected to a top inlet disposed at a top of the housing and extending from top of the housing through the plurality of catalyst layer beds and in fluid connection with a space between the inclined surface and the layer of solid catalyst in each of the catalyst bed layers, so that a gas phase product generated by reaction of the gas phase feed with the liquid phase feed in the catalyst bed layer is configured to enter the gas phase channel; and a bottom outlet disposed at a bottom of the housing, wherein each catalyst bed layer is further provided with:

an overflow weir arranged at a side adjacent to the gas phase channel; and a liquid-sealing baffle arranged at an upper part of the overflow weir and configured to separate the gas phase feed from the gas phase product, wherein the liquid-sealing baffle comprises:

a horizontal part, which is in an annular flat plate shape and disposed above the overflow weir; and a vertical part, which is in a cylindrical shape and is integrally formed with the horizontal part, and a lower end of the vertical part is spaced apart from the bottom of the catalyst bed layer.

2. The catalytic reaction unit of claim 1, wherein the inclined surface as a whole is an umbrella-shaped partition.

3. The catalytic reaction unit of claim 2, wherein a tail end of the umbrella-shaped partition is provided with an annular downcomer, and a bottom of the annular downcomer is spaced apart from the bottom of the corresponding catalyst bed layer by a certain distance, so that the liquid phase feed enters the catalyst bed layer in a radial direction.

4. The catalytic reaction unit of claim 3, wherein the liquid phase feeding subunit further comprises:

a liquid phase feed pipe extending in the radial direction of the catalytic reaction unit; and a liquid phase distribution pipe, which is annular and orthogonal or tangential to the liquid phase feed pipe, wherein a pipe wall of the liquid phase distribution pipe is provided with a plurality of pores for distributing the liquid phase feed to the annular downcomer.

5. The catalytic reaction unit of claim 1, wherein a top edge of the overflow weir is higher than a top surface of the solid catalyst layer by 10-100 mm.

6. The catalytic reaction unit of claim 1, wherein the gas phase feeding subunit comprises:

a gas phase feed pipe extending in the radial direction of the catalytic reaction unit; and a gas phase distribution pipe, which is in an annular shape or multi-layer concentric ring shape, and is orthogonal or tangential to the gas phase feed pipe, with a wall surface of the gas phase distribution pipe provided with a plurality of pores for distributing the gas phase feed to the bottom of the catalyst bed layer.

7. The catalytic reaction unit of claim 6, wherein the gas phase feeding subunit further comprises:

a gas phase distribution disk is provided with a plurality of pores and is disposed at the bottom of the catalyst bed layer.

8. The catalytic reaction unit of claim 6, wherein the gas phase distribution pipe is disposed below or inside the catalyst bed layer.

9. The catalytic reaction unit of claim 1, wherein the gas phase channel is disposed in a center of the catalytic reaction unit and extends through all of the plurality of catalyst bed layers from bottom to top.

10. The catalytic reaction unit of claim 1, wherein each catalyst bed layer is 10 mm-1,000 mm in height.

11. A method of reactive distillation, comprising introducing the gas phase feed and the liquid phase feed into the catalytic reaction unit of claim 1, wherein the gas phase feed and the liquid phase feed react in each of the plurality of catalyst bed layers in the presence of the solid catalyst; and outputting the gas product through the top outlet and a liquid product through the bottom outlet.

* * * * *